3,521,386
SHELLFISH HARVESTING MACHINE
Gilbert W. Francklyn, Poulsbo, Wash. 98370
Continuation-in-part of application Ser. No. 751,828,
Aug. 12, 1968. This application Aug. 7, 1969, Ser.
No. 848,228
Int. Cl. E02f 5/00
U.S. Cl. 37—55                                                           8 Claims

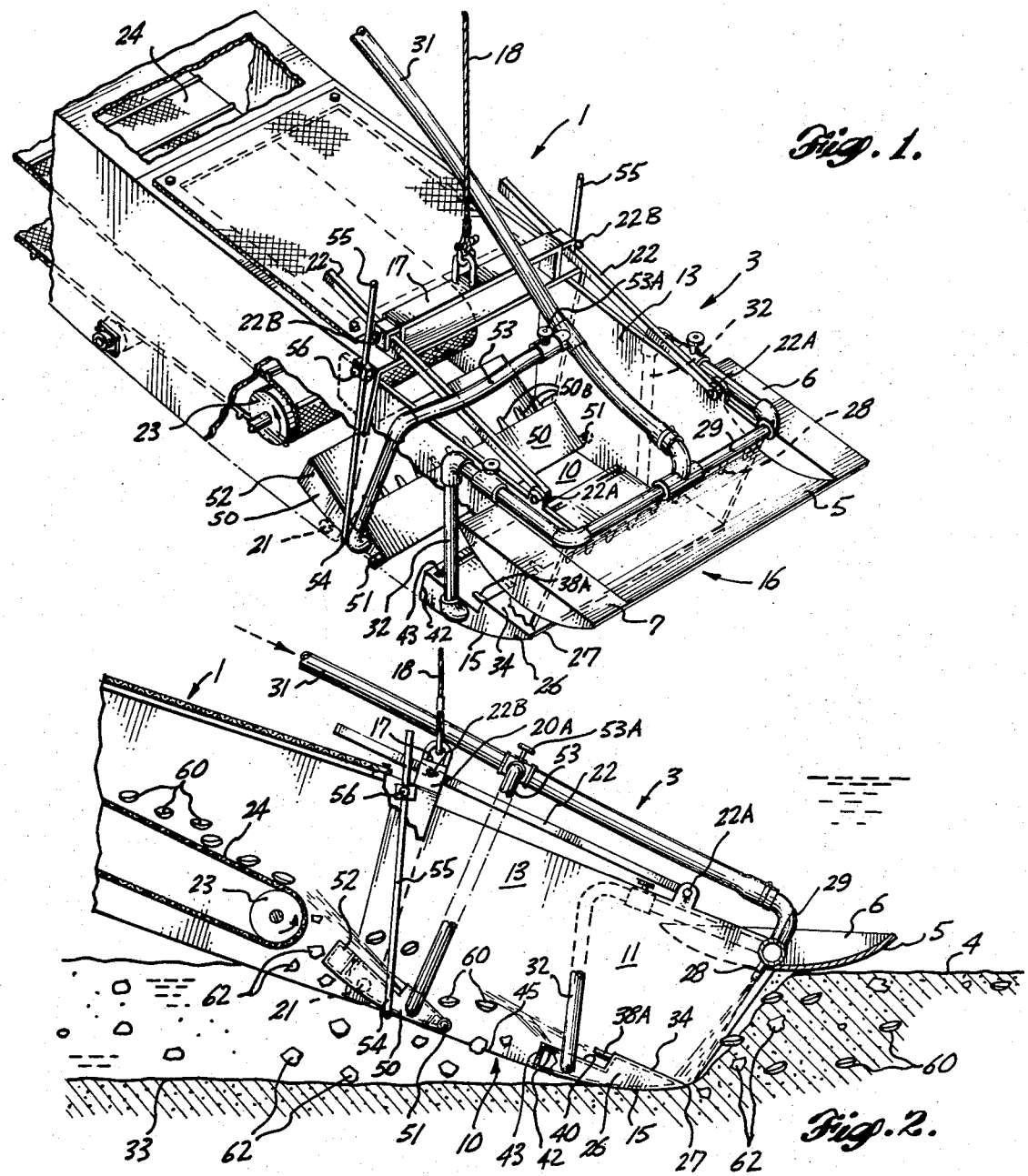
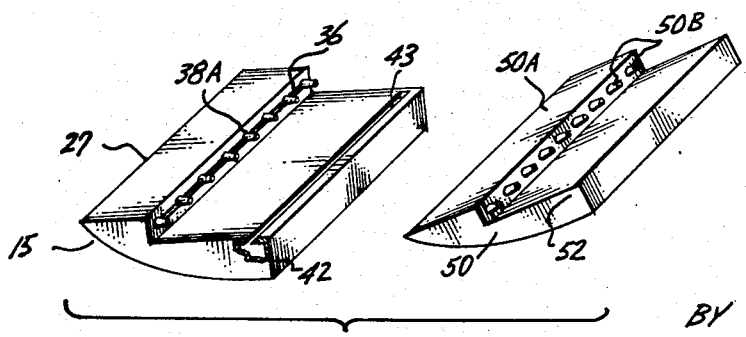

ABSTRACT OF THE DISCLOSURE

A shellfish harvesting machine having a first blade or scoop with fluid jets aimed rearwardly from the blade of the scoop, in combination with a second blade having similar rearwardly aimed jets. Many rocks and unneeded material entering the scoop fall through apertures formed in the bottom of the scoop between the rear edge of the first blade and the front edge of the second. The lighter shellfish material carried by the fluid jets across the apertures reaches the second blade and are transferred to the conveyor. The second blade by being inclined between the apertures and conveyor presents another barrier for the rocks causing them to tumble forwardly through the apertures while the shellfish transit the blade and fall onto the conveyor.

---

This application is a continuation-in-part of my pending application, Ser. No. 751,828, filed Aug. 12, 1968, now U.S. Pat. No. 3,462,858 bearing the same title.

This invention relates to an improvement in shellfish harvesting machinery and particularly to an apparatus for separating the shellfish from other material dug up by the machine prior to conveying the shellfish to the surface where it is collected. Since shellfish, particularly clams, reside beneath the floor of a water body, commercial harvesters of shellfish have been developed which dredge up a layer of the seat bottom to separate the shellfish from the other dredged material. One such system currently in use is that disclosed in the United States patent to Hanks, No. 2,672,700. As disclosed therein a self-propelled boat transits the harvesting area with the shellfish harvesting mechanism suspended downwardly from the boat with one end riding along the sea floor on skids. Depending downwardly from the skids is a scoop having at its lower edge a blade for cutting into the mud, sand, and other material in the sea floor conveying it through the scoop to a conveyor having one end positioned at the rear end of the scoop and the other end positioned at the boat. The dredging force is reduced by means of high pressure fluid jets projecting downwardly from the skids toward the scoop knife edge to break up the sea bottom material making it easier to flow through the scoop. At the top end of the conveyor, a crew is used to separate the shellfish from the rocks, mud, and other material brought up to the surface from a conveyor so that the shellfish can be harvested and the unneeded material is permitted to fall back into the water from the end of the conveyor to fill up the hole made by the scoop.

While the Hanks type of harvesting machine has been successfully used, the economics of present day shellfish operations require an increased yield without a significant increase in equipment cost and labor cost. One of the disadvantages of the Hanks machine is that it would load the front blade with sand, gravel, rock, and shell material. It has been found in practice that this causes the scoop to plug up and quit functioning entirely. The net result would then be that no further material could get to the conveyor belt.

In view of the demands for increased efficiency and production for shellfish harvesting equipment, it is a principal object of the instant invention to provide a generally improved harvesting machine which increases the shellfish yield without significantly increasing the cost of the harvesting equipment.

Another object of the instant invention is to provide an improved shellfish harvesting machine which by design eliminates the need for conveying all of the material entering the scoop up to the surface and thereby reduces the wear and tear on the conveying equipment and also reduces the sorting and selection labor requirements at the surface.

Another object of the instant invention is to provide a generally improved shellfish harvesting machine which reduces the amount of shellfish breakage by reducing the number of rocks conveyed from the scoop to the surface.

A still further object of the instant invention is to provide a modification for existing shellfish harvesting equipment which can be easily fabricated to provide a significant increase in capacity of such equipment.

A related object of the instant invention is to provide a generally improved shellfish harvesting machine which reduces the towing effort required for harvesting the same amount of shellfish as previously harvested by prior art machines and permits deeper dredging cuts yielding shellfish too deep beneath the bottom to be harvested by prior art machines.

In accordance with the present invention the towing effort for existing shellfish harvesting equipment is significantly reduced by providing fluid jets under pressure in the body of a first scoop blade with the jets directed to the rear of the scoop to assist in the acceleration of the material flowing through the scoop toward the conveyor. To provide a significant increase in the yield of existing harvesting equipment, such as the Hanks equipment previously described, the bottom wall of the scoop contains apertures in the area between the rear end of the first blade and the leading edge of a second blade, and also between the second blade and the input end of the conveyor. Rocks and other heavy clumped material which passes the blades tend by their weight to fall through the apertures while the lighter shellfish material is buoyed up by the fluid jets emanating from the blades and are thereby carried onto the conveyor. By positioning the second blade to act as a pivotally mounted deflector blade adjacent to the infeed end of the conveyor and the bottom wall apertures, it is possible to regulate the amount of rocks which are prevented from passing over the deflector blade and onto the conveyor by increasing the angle of the deflector blade such that the rocks tumble down the blade through the apertures and out of the scoop while the lighter shellfish tend to be washed up the surface of the deflector blade and carried onto the conveyor through the action of the fluid jets from the second blade. The sorting effort at the surface is reduced through the reduction of the amount of rocks and mud mixed in with the shellfish. The pulling effort is reduced by the additional material propelling energy from the fluid jets in the blade as well as by the weight reduction of the material passing through the apertures in the bottom wall of the scoop.

These and other features and advantages of the invention will become more clearly apparent from the following detailed description thereof, which is to be read with reference to the accompanying drawings.

BRIEF DESCRIPTION OF THE DRAWINGS

In the drawings:

FIG. 1 is an isometric view illustrating the lower end of an improved shellfish harvesting machine made in accordance with the instant invention; and FIG. 2 is a side section view of the shellfish harvesting machine shown in FIG. 1, schematically illustrating the action of the blade nozzles, scoop floor apertures, and the deflector plate in operation;

FIG. 3 is a perspective view of one of the blade assemblies.

DESCRIPTION OF THE PREFERRED EMBODIMENT

For ease of understanding the structural improvements of the instant invention each will be disclosed with reference to the shellfish harvesting machine disclosed in the previously-mentioned patent to Hanks, recognizing that other harvesting machines could be modified by those skilled in the art following the principles disclosed with relation to the instant improvements.

With reference to FIG. 1 it is noted that the harvester 1 is depended downwardly from the vessel (not shown) and includes a scoop 3 which is guided along the undisturbed bottom surface 4 by means of a skid plate 5 attached to side runners 6 and 7. Scoop 3 includes downwardly spaced side walls 10 and 11 which are joined at the top by top wall 13 and enclosed at the bottom by bottom wall 15 to define a scoop opening 16. Scoop 3 is supported from the vessel (not shown) by means of a connection between the frame bale plate 17 extending across top wall 13 and a support cable 18. The rear end of scoop 3 is connected to conveyor housing 20 extending toward the water surface through a pivot connector 21. Control rods 22 pinned to the front of the scoop at 22A and selectively locked to the frame 20A on the top of housing 20 by set screws 22B determining the angle of the scoop relative to the housing 20. As shown through the conveyor housing 20 the lower end of conveyor 23 includes a screen-like conveyor belt 24 which is operated so that its upper flight is moving upwardly, as shown by the arrow, for transporting the shellfish 60 from scoop 3 up to the surface vessel.

Extending from the forward edge of the scoop bottom wall 15 is the front blade 26 having a leading edge 27. To the rear of skid plate 5, extending transversely across the top of scoop opening 16 are a series of skid nozzles 28 directing fluid (preferably water) under pressure toward the blade edge 27 and into scoop opening 16 to assist in the breaking up of the material passing through scoop opening 16. Skid nozzles 28 are provided by a fluid under pressure through a fluid manifold 29 from a supply hose 31 dependent from the towing vessel. Extending downwardly from fluid manifold 29 toward one end of blade 26 is a blade supply line 32 providing fluid under pressure to the interior of blade 26.

As best shown in FIG. 2, as the scoop 3 is pulled along by a cable 18 it is guided along the bottom 4 by runners 6, 7, with the blade 26 cutting into the bottom to a dredged surface 33 so that the material cut by blade 26 flows through the scoop opening 16. Blade 26 defines a first blade surface 34 extending rearwardly from leading edge 27 and having a rear edge forming a stepped edge 36 as it extends downwardly toward scoop bottom wall 15 until it joins the second blade surface 40 extending to the blade's rear surface 42. Emanating along stepped edge 36 and directed rearwardly are blade nozzles 38. The top surface 40 also has an angled slot cut 43 therein for directing fluid under pressure upwardly and rearwardly toward the conveyor 23. The slot 43 could as well be provided at an angle in surface 42. The blade portion 36 between adjacent nozzles 38 is provided with slots 38A so that a sheet of water flows across the blade surface 40. The additional flow provided by the fluid under pressure from the blade nozzles 38, slots 38A and 43 assists in the movement of the material entering scoop opening 16 thereby reducing the drag caused by the bunching of this material previously occurring in a similar scoop structure.

In order that a large portion of the rocks 62 which enter through scoop opening 16 are not carried up conveyor belt 24, bottom wall 15 of scoop 3 defines an aperture 45 extending in the scoop bottom wall portion between the rear edge 42 of blade 26 toward the lower end of the conveyor 23. The aperture is provided by a major separation between the forward portion of the bottom wall 15 and the rear portion of the scoop assembly. Since rocks 62 are heavier than shellfiish 60, they tend to fall through the aperture 45, whereas shellfish 60 are carried by the fluid under pressure emitting from the blade nozzles 38, and slots 38A and 43 toward the lower end of conveyor 23.

As an additional means for controlling the amount of rocks 62 reaching conveyor belt 24, a second blade referred to as a deflector blade 50 is placed within the rear end of scoop 3 to extend transversely across the path of the material passing across the aperture 45 to present an inclined plane 50A extending from the lower leading edge of the blade. The blade 50 can be similar to blade 26, although the long slot 43 can be eliminated in the blade 50 due to the proximity of the rear edge 52 of the blade to the conveyor. Water is provided to the interior of blade 50 by flexible conduit 53 having flow control 53A therein. Blade 50 is pivoted at the outer ends 51 of its leading edge. Positioning rod 54 beneath the blade 50 is attached to the adjustment rods 55 which can be locked by set screws 56 in any position. Thus the rod 54 serves as a control for setting the angle of deflection of deflector plate 50. Some of the rocks 62 which had sufficient velocity to pass from blade 26 will strike deflector blade 50 but, due to the incline of deflector blade 50, most of those rocks are unable to continue their path upwardly and have a tendency to tumble forward and out of scoop 3 through the aperture 45, coming again to rest upon the dredge surface 33 filling up the cut made by the scoop 3.

While the operation of the individual improvements disclosed herein has been related as these items have been described, for purposes of a summary the operation of the improved harvesting machine 1 is again related. Harvester 1 is suspended by cable 18 from a supporting towing vessel (not shown) down against bottom 4 in the harvesting area. The vessel pulls the scoop 3 along bottom 4 with the skid plate 5 and side runners 6 and 7 riding on the bottom 4. Blade 26 thus cuts into the bottom material and dredges to a surface 33. The material cut by the blade 26 and the leading edges of scoop side walls 10 and 11 enter through the scoop opening 16 and are propelled rearwardly through the combined effects of the motion provided by the towing vessel and the fluid under pressure emanating from skid nozzles 28, blade nozzles 38, and slots 38A and 43. A separation of shellfish 60 from the heavier rocks and mud 62 is accomplished by means of bottom wall aperture 45 defined by bottom wall 15 of scoop 3 between rear edge 42 of the blade 26 and the lower end of conveyor 23. The heavier material tends to fall through the sheet of water flowing from nozzles 38 and slots 38A and 43, but lighter shellfish material 60 is buoyed up by the sheet of water and continues in its path toward the conveyor belt 24 where it is carried up to the tending vessel. Additional control of the amount of rocks and other material is obtained by utilization of deflector blade 50 which is inclined across the path of the rocks 62 and shellfish 60 as they pass over the bottom wall aperture 45 toward the lower end of conveyor 23. The angle of the deflector blade can be increased to make it more difficult for the heavier rocks 62 to transit across deflector plate 52 from its leading edge 51 to its trailing edge 52 and onto the conveyor belt 24 with the sheet of water from blade 50 serving to assist the flow of shellfish to the conveyor.

It is therefore seen that conveyor belt 24 is used primarily to carry the lighter shellfish material 60 rather than a combination of mud, shellfish and rocks. This also means that the propelling assistance provided by the flow of water from the blades reduces the drag of the scoop 3 and thereby reduces the pulling force required on the cable 18 depending from the towing vessel. In addition, it is noted that a good portion of the material entering the scoop opening 16 exits from scoop 3 through bottom wall aperture 45 therefore permitting a greater amount of material to enter scoop opening 16 while having a reduction in the amount of material conveyed by conveyor belt 24. The reduction of the amount of rocks and other undesired material mixed in with the desired shellfish results in a higher yield at the vessel with less sorting effort.

What is claimed is:

1. A shellfish harvesting apparatus comprising in combination: an elongated conveyor means having housing means disposed about at least a portion thereof; a scoop pivotally secured to said housing means and having a first blade at the lower open end of the scoop, said blade having a forward cutting edge, an upper surface for supporting material entering the scoop, and a remote edge portion depending downwardly from said upper surface at a location rearward from said cutting edge, said remote edge portion having opening means therein for directing fluid under pressure toward said conveyor means from a location below said blade upper surface; a second blade disposed between the remote edge of said first blade and said conveyor means and having a first deflection surface in the path of fluid ejected from said first blade, said second blade having opening means therein for directing fluid under pressure toward said conveyor means; and means for supplying fluid under pressure to each of said blades for ejection through the said opening means therein.

2. The apparatus of claim 1 including means for adjusting the position of said second blade in the flow of fluid from said first blade.

3. The apparatus of claim 1 wherein said opening means in said first blade includes a plurality of nozzle means and a plurality of elongated slits interconnecting adjacent nozzle means.

4. The apparatus of claim 1 wherein said first blade has a second substantially flat surface extending from below said opening means toward said conveyor means, a second rear surface depending downwardly from said second substantially flat surface, and second opening means for directing fluid under pressure upwardly from said second flat surface and partially toward said second blade.

5. The apparatus of claim 4 wherein said second opening means is an elongated slot extending across the width of said first blade.

6. The apparatus of claim 1 wherein the opening means in said second blade is located below said first deflection surface, and said second blade has a second deflection surface located beneath said opening means of the second blade and extending toward said conveyor means to define a surface over which fluid ejected from said opening means of said second blade passes.

7. A digging member for a shellfish harvesting machine comprising a blade having a forward cutting edge, an upper surface for supporting material, a first substantially vertical wall extending downwardly from said upper surface and having first opening means therein for ejecting pressurized fluid from inside the blade in a direction which is away from said cutting edge, a second substantially flat surface extending rearwardly from said wall and below said first opening means, and second opening means in said blade for directing pressurized fluid from inside said blade in a direction which is upward and rearward relative to said second surface.

8. Apparatus as defined in claim 7 wherein said second opening means is a slot cut at an angle through said second surface.

References Cited

UNITED STATES PATENTS

| | | | |
|---|---|---|---|
| 1,180,664 | 4/1916 | Littlehales | 37—62 |
| 1,507,864 | 9/1924 | Smith | 302—14 XR |
| 2,144,743 | 1/1939 | Schulz. | |
| 2,288,701 | 7/1942 | Heden | 37—55 |
| 2,672,700 | 3/1954 | Hanks | 37—55 |
| 3,184,866 | 5/1965 | McMillin | 37—55 |

ROBERT E. PULFREY, Primary Examiner

C. D. CROWDER, Assistant Examiner

U.S. Cl. X.R.

299—8; 56—9; 37—63, 141